United States Patent [19]

Okano et al.

[11] Patent Number: 4,866,394
[45] Date of Patent: Sep. 12, 1989

[54] PHASE SYNCHRONIZING CIRCUIT FOR A TIME AXIS SHIFT CORRECTING CIRCUIT

[75] Inventors: Takashi Okano; Toru Akiyama, both of Saitama, Japan

[73] Assignee: Pioneer Electronic Corporation, Tokyo, Japan

[21] Appl. No.: 165,211

[22] Filed: Mar. 8, 1988

[30] Foreign Application Priority Data

Mar. 9, 1987 [JP] Japan .................................. 62-53259

[51] Int. Cl.⁴ .......................... H03K 5/22; H03K 1/17
[52] U.S. Cl. ..................................... 328/109; 328/63; 328/133; 328/155; 307/516; 307/262; 307/518
[58] Field of Search ................. 328/133, 155, 109, 63; 331/1 A, 14; 307/510, 514, 516, 262, 518

[56] References Cited

U.S. PATENT DOCUMENTS 4,625,180  11/1986  Itaya et al. ............................. 331/14
4,743,864   5/1988  Nakagawa et al. .................. 307/516

Primary Examiner—Stanley D. Miller
Assistant Examiner—Richard Roseen
Attorney, Agent, or Firm—Sughrue, Mion, Zinn, Macpeak & Seas

[57] ABSTRACT

A phase synchronizing circuit for a time axis shift correcting circuit includes a closed-loop phase lock circuit of a phase comparator, a VCO, and a frequency division counter, for providing an output signal phase locked to a reference signal included in an input data signal. Hold circuitry, responsive to a hold instruction signal, is provided to hold the phase relationship of the output signal held just prior to the hold instruction signal for the duration of the hold instruction signal. The hold instruction signal is produced in response to a predetermined condition of the input data signal.

14 Claims, 3 Drawing Sheets

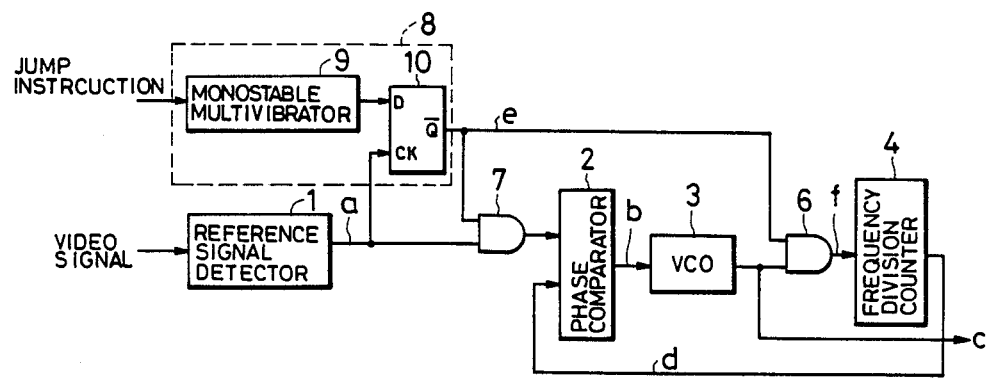
FIG. 6
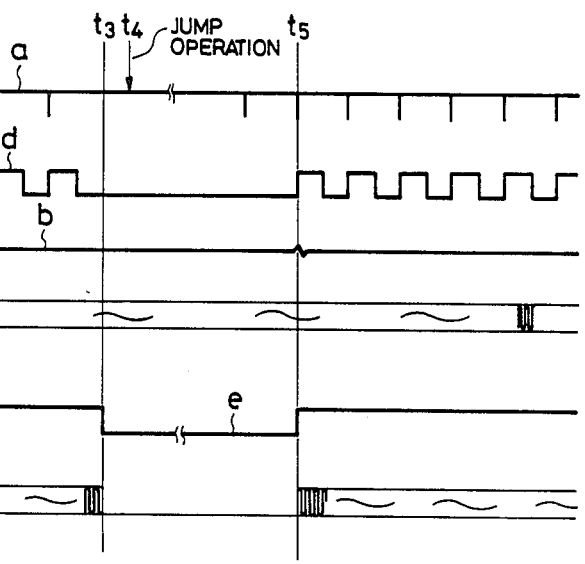
FIG. 7(A)
FIG. 7(B)
FIG. 7(C)
FIG. 7(D)
FIG. 7(E)
FIG. 7(F)

PHASE SYNCHRONIZING CIRCUIT FOR A TIME AXIS SHIFT CORRECTING CIRCUIT

BACKGROUND OF THE INVENTION

1. Field of the Invention

This invention relates to phase synchronizing circuits, and more particularly to a phase synchronizing circuit in a device for reproducing data signals from recording media.

2. Background Art

When data signals are read out of a recording medium, such as a video disk rotating at a uniform speed, the time axis of the read signals is shifted, adversely affecting the reproduced images. Time axis shift is caused by the eccentricity of the recording medium or irregular rotation of the rotating mechanism.

In a method extensively employed to eliminate this time axis shift, a pulse signal synchronous with the time axis shift of the reproducing signal is formed, the reproducing signal is loaded in a memory with the synchronous pulse signal and then read with a frequency stable reference pulse signal. FIG. 1 shows a conventional phase synchronizing circuit for producing a pulse signal synchronous with the time axis shift of a reproducing signal in a time axis correcting system. In FIG. 1, a video signal, such as producing by a video disk, is applied to a reference signal detecting circuit 1 comprising a synchronizing separator circuit or the like, in which a horizontal synchronizing signal is separated from the video signal and outputted as a reproducing reference signal a. The reference signal detecting circuit 1 may be so designed that a pulse signal produced at a particular zero crossing point of the burst signal in the video signal is outputted as the reproducing reference signal.

The reproducing reference signal a outputted by the reference signal detecting circuit 1 is supplied to a phase comparison circuit 2, which also received the output d of a frequency division counter 4. The counter 4 subjects the output of a VCO (voltage controlled oscillator) 3 to 1/N frequency division. Thus, in the phase comparison circuit 2, the phase of the output d is compared with that of the reproducing reference signal a, and an error signal corresponding to the phase difference between the signals is formed by a sampling control system. That is, the phase comparison circuit 2 forms a saw tooth signal with the aid of the output d of the frequency division counter 4, and outputs the error signal b, obtained by sampling and holding the saw tooth signal in response to the reproducing reference signal a. The error signal b is applied, as a control signal, to the VCO 3, which outputs a clock pulse c synchronous with the time axis variation of the reproducing reference signal a.

The above-described phase synchronizing circuit is advantageous in that it is simple in arrangement and stable in operation. That is, when the frequency division ratio of the frequency division counter 4 is set to N, the oscillation frequency of the VCO is N·$f_H$, where $f_H$ is the horizontal synchronizing frequency. However, this conventional circuit is disadvantageous in that it cannot immediately respond to an abrupt phase change of the reproducing reference signal a. In order to allow the circuit to quickly respond to an abrupt phase change, it is necessary to increase the loop band. However, in the sampling control system in which the reproducing reference signal is inputted with a period of 1H (63.5 μs), the loop band is limited because of the phase lag.

If the phase synchronizing circuit has a slow response time, then when broadcasting VTR, the follow-up characteristic with the phase jump of a reproducing horizontal synchronizing signal due to a skew failure or with the phase variation or a reproducing horizontal synchronizing signal in a special reproduction mode becomes slow. Therefore, the time axis correcting capacity is reduced. In the case of a video disk, an image memory is utilized so that, even with a constant linear velocity (CLV) disk, a special reproduction such as a still picture reproduction can be achieved. However, if the VCO does not immediately respond to the phase discontinuation of the reproducing horizontal synchronizing signal which is caused by a track jumping operation, then the picture reproduced on the TV monitor has irregular color or appears distorted or out of synchronization. This will be described in more detail.

When as shown in FIG. 2, a track jumping operation occurs on playing a CLV disk (shown at time instant $t_1$), the error signal b outputted by the phase comparison circuit 2 is irregular for a period of time, $t_1$ to $t_2$. This results because, even if the phase of the reproducing reference signal a is coincident with that of the output d of the frequency division counter 4 before the time instant $t_1$, as shown in FIG. 3, the track jump breaks the continuation of the reproducing reference signal a. As a result, as shown in FIG. 4, the phase of the reproducing reference signal a is shifted from that of the output d of the frequency division counter 4. The VCO 3 is closed-loop-controlled with a sample value taken every 1 H. Therefore, even if the loop characteristic is improved, the time required for convergence of the phase shift is limited. Accordingly, for the period of time ($t_1$ to $t_2$) in which the phase error is large, writing data into the image memory should be inhibited. However, if the track jumping operation is repeatedly carried out within a short period, the time period in which the phase error is in coincidence is decreased, so that it becomes impossible to write data in the image memory. That is, it is impossible to achieve the desired special reproduction with high accuracy.

One example of a conventional phase synchronizing circuit with an excellent response characteristics is shown in FIG. 5. In FIG. 5, a reference signal detecting circuit 1 outputs a reproducing reference signal a, which is applied to a frequency-synchronized control circuit 5 and applied, as a reset signal, to a VCO 3. In the circuit 5, the reproducing reference signal a is compared with the output of the VCO, and an error signal corresponding to the frequency difference and phase difference between the two signals is formed. The error signal thus formed is applied, as a control signal, to the VCO 3. The circuit of FIG. 5 is controlled so that the frequency ratio of the reproducing reference signal a to the output clock signal of the VCO 3 is a predetermined value. Under this condition, the phase of the VCO 3 is reset by the reproducing reference signal every other 1H (horizontal line period). Owing to this phase resetting operation, the phase and frequency of the clock signal outputted by the VCO 3 are immediately set to predetermined values. This means that the circuit has an excellent response characteristic. However, this conventional phase synchronizing circuit suffers from the following disadvantage. Frequency control is carried out in the circuit, and therefore the oscillation frequency of the VCO may be locked at a frequency (N+1)·$f_H$ or (N−1)·$f_H$ as well as the above-described frequency N·$f_H$. Accordingly, the frequency-synchronized control circuit 5 should be designed to prevent this phenomenon. Therefore, this conventional phase synchronzizing circuit has unavoidably intricate circuitry.

SUMMARY OF THE INVENTION

An object of this invention is to provide a phase synchronizing circuit which is simple in circuitry and which as an excellent response characteristic.

The phase synchronizing circuit of the invention is designed so that a hold instruction signal is produced for a period of time including the discontinuation interval of the data signal. In response to the hold instruction signal the count value of a frequency division counter which is adapted to frequency-divide the output of the VCO forming a PLL loop is held. The count value thus held is set in the frequency division counter upon elimination of the hold instruction signal.

BRIEF DESCRIPTION OF THE DRAWINGS

FIG. 6 is a block diagram illustrating an embodiment of the invention.

FIGS. 7A–7F are waveform diagrams of signals produced by the circuitry of FIG. 6.

DESCRIPTION OF THE PREFERRED EMBODIMENT OF THE INVENTION

One preferred embodiment of this invention will be described with reference to FIGS. 6 through 9.

Figure 1:
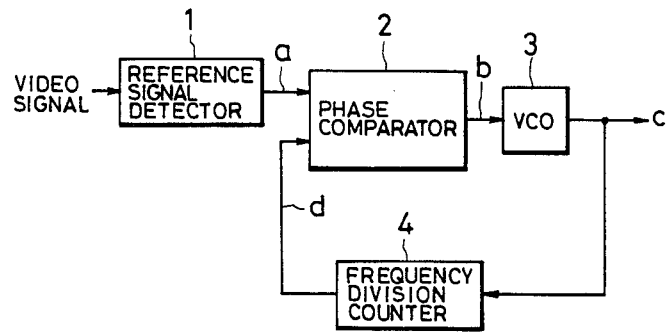
FIG. 1 is a block diagram of a conventional phase synchronizing circuit.

In the circuit of FIG. 6, a phase comparison circuit 2, a VCO 3 and a frequency division counter 4 are connected in the same manner as those in FIG. 1 except that the VCO 3 is connected through an AND gate 6 to the frequency division counter 4. A reproducing signal a outputted by a reference signal detecting circuit 1 is applied through an AND gate 7 to the phase comparison circuit 2. These AND gates 6 and 7 receive the output of a hold instruction generating circuit 8. The circuit 8 comprises a monostable multivibrator 9, to which a jump instruction signal is supplied as a trigger input, and a D flip-flop 10 to which the output of the monostable multivibrator 9 is applied as the D input. The reproducing reference signal a is supplied as a clock input to flip-flop 10. The $\overline{Q}$ output of the D flip-flop 10 is provided as a hold instruction signal e by the monostable multivibrator 9. In the circuit, at least a 1H delay time is provided between the production of the jump instruction signal applied to the monostable multivibrator 9 and the start of the jump operation.

The operation of the circuit of FIG. 6 will be described with reference to FIGS 7A–7F. FIG 7A is a waveform diagram showing the reproducing reference signal. FIG. 7B is a waveform diagram showing the output d of the frequency division counter. FIG. 7C is a waveform diagram showing an error signal b outputted by the phase comparison circuit 2. FIG. 7D is a waveform diagram showing the signal c from the VCO 3. FIG. 7E is a waveform diagram showing the hold instruction signal e. FIG. 7F is a waveform diagram showing an input signal f applied to the frequency division counter 4.

The monostable multivibrator 9 is triggered on generation of the jump instruction signal so that the Q output is held at the high level for a period of time T corresponding to a time constant, determined by a resistor and a capacitor, of the monostable multivibrator. As a result, the D flip-flop 10 is set by the reproducing reference signal a to provide the hold instruction signal e at the low level beginning at the time $t_3$. The jump operation begins thereafter at time $t_4$. The jump operation ends with the termination of time period T. The reproducing reference signal a is thereafter again produced. The D flip-flop 10 is thus reset so that the hold instruction signal e is eliminated at the time $t_5$.

Figure 2:
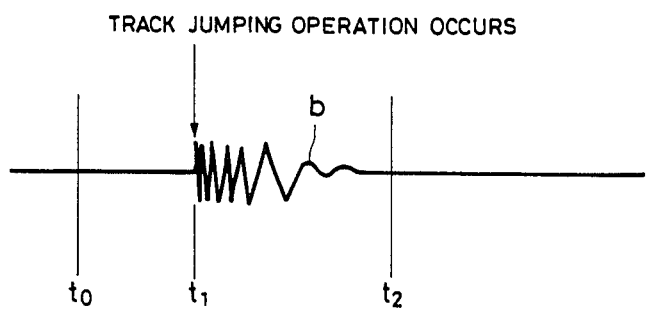
FIGS. 2 through 4 are waveform diagrams of signals produced by the circuitry of FIG. 1.
Figure 3:
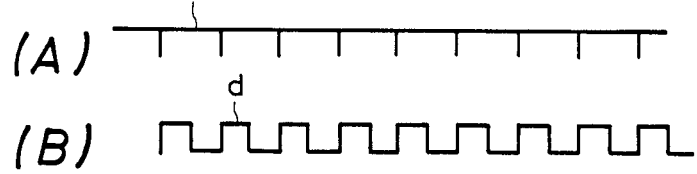
Figure 4:
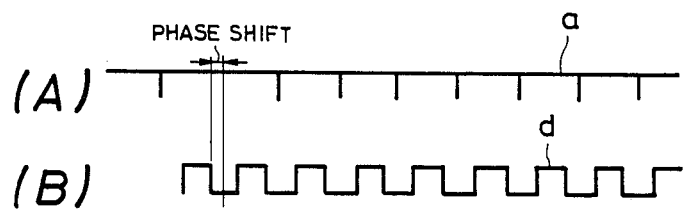
Figure 5:
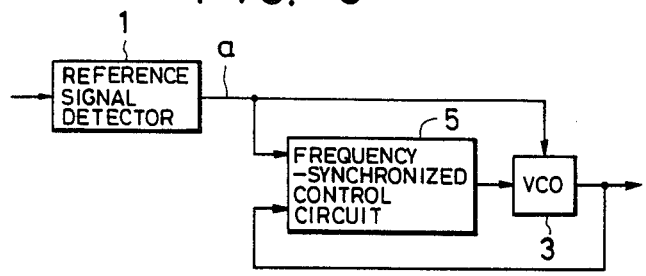
FIG. 5 is a block diagram of another conventional phase synchronizing circuit.

The hold instruction signal e is applied to the AND gate 6. Therefore, with the reproducing reference signal a occurring just prior to the start of the jump operation, the supply of the clock signal c to the frequency division counter 4 is suspended, so that the value held by the frequency division counter 4 just prior to the suspension of the application of the clock signal remains therein. Upon elimination of the hold instruction signal e, the application of the clock signal c to the frequency division counter 4 is again started, and the count value of the frequency division counter 4 can be changed. Accordingly, irrespective of the discontinuation of the reproducing reference signal a, the frequency division output of the frequency division counter is held in the phase relationship it held just prior to the occurrence of the discontinuation. Therefore, disorder as illustrated in FIG. 2 is eliminated from the waveform of the phase error signal b.

Sometimes, at the time instant $t_5$, a slight transient occurs in the phase error signal b. This is caused by the connection error of ±1 clock pulse maximum. The connection error may occur when the application of the clock signal to the frequency division counter 4 is inhibited by the AND gate 6. This difficulty can be more effectively eliminated by setting the clock frequency to a higher value. In practice, the transient causes no operational problems because the frequency of the clock signal for quantitizing the video signal is generally on the order of 10 MHz.

Figure 8:
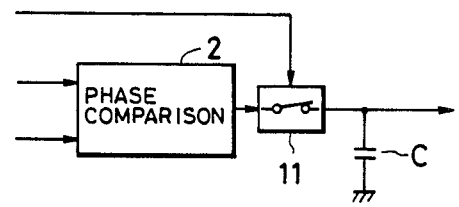
FIG. 8 is a block diagram of circuitry for holding a phase error signal at a predetermined level.

For the period of time $t_3$ to $t_4$, for which the counting operation of the frequency division counter 4 is suspended, the output d of the frequency division counter 4 which is applied to the phase comparison circuit 2 is maintained unchanged. On the other hand, for the same period of time, the application of the reproducing reference signal a to the phase comparison circuit 2 is suspended by the AND gate 7, and therefore the phase error signal b is maintained until the counting operation of the frequency division counter 4 is suspended. The above-described system of holding the phase error signal b is effective when the phase comparison circuit is operated according to a method by which the output of the frequency division counter 4 is utilized to form a slope waveform, and a signal having the slope waveform is sampled and held with the reproducing reference signal a. However, the phase error signal b may be held by other methods depending on the system employed by the phase comparison circuit. For instance, a system as shown in FIG. 8 may be employed. In FIG. 8, the output terminal of the phase comparison circuit 2 is grounded through a series circuit of a switch 11 and a capacitor C, and the switch 11 is opened by the hold instruction signal e to thereby directly hold the phase error signal b.

Figure 9:
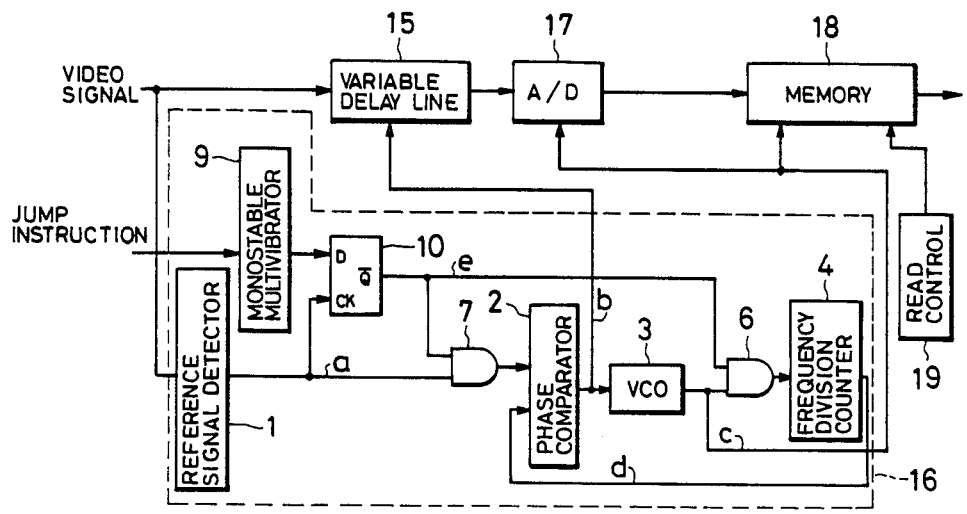
FIG. 9 is a block diagram of a time axis correcting circuit which includes the phase synchronizing circuit according to the teachings of the invention.

FIG. 9 is a block diagram showing a circuit which employs the phase synchronizing circuit of the invention for time axis correction. In FIG. 9, a video signal read, for instance, out of a video disk is applied to a variable delay line 15 and to the reference signal detecting circuit 1 in the phase synchronizing circuit according to the invention. The reproducing reference signal a outputted by the reference signal detecting circuit 1 is applied through the AND gate 7 to the phase comparison circuit 2. The output of the circuit 2 is supplied to the VCO 3 and applied, as a control input signal, to the variable delay line 15. The output of the variable delay line 15 is supplied to an A/D (analog-to-digital) converter 17, to which the clock signal c is supplied by the VCO 3. In the A/D converter 17, the delayed video signal is sampled and the sampled value is quantized into a digital signal. The output data of the A/D converter 17 is applied to a memory 18. The clock signal c is applied, as a writing clock signal, to the memory 18, while a read control circuit 19 supplies a reading clock signal having a predetermined frequency to the memory 18. The memory 18 comprises a FIFO (first in, first out) type video line memory (for instance a μ41101c memory) which can perform reading and writing completely independently of each other. Video data are sequentially written into the memory 18 with the aid of the clock signal c which is synchronous with the time axis variation of the input video signal, and the video data thus loaded are successively read out with the clock signal stable in frequency. Thus, a video signal whose time axis has been corrected with the data read out of the memory 18 can be obtained. In other words, the time axis of the video signal is corrected with the aid of the data read out of the memory 18.

The variable delay line 15 is provided to eliminate the time axis variation which is so quick that the phase synchronizing circuit 16 cannot follow it, before the video signal reaches the A/D converter 17.

As described above, the phase synchronizing circuit of the invention produces a hold instruction signal over a period of time including the discontinuation interval of the data signal. In response to the hold instruction signal, the count value of the frequency division counter adapted to frequency-divide the output of the VCO forming the PLL loop is held, and the count value thus held is set in the frequency division counter when the hold instruction signal is eliminated. Therefore, the phase synchronizing circuit of the invention is simple in construction and has an excellent response characteristic.

What is claimed:

1. In a time axis shift correcting circuit, a phase synchronizing circuit for producing a signal synchronous with a time axis shift of a reproducing signal comprising:
reference signal detecting means for detecting an input data signal and reproducing a reproducing reference signal corresponding to a reference signal at a predetermined frequency included in said data signal;
oscillating means for producing an oscillating signal at a frequency according to a control signal input to said oscillating means;
frequency division counter means for frequency dividing said oscillating signal to produce a frequency divided oscillating signal;
phase comparator means responsive to said reproducing reference signal and said frequency divided oscillating signal for producing said control signal according to a phase difference between said reproducing reference signal and said frequency divided oscillating signal, said oscillating signal being a clock signal following a time axis variation of said input data signal;
hold instruction means, responsive to discontinuance of said input data signal, for producing a hold instruction signal having a duration at least equal to a discontinuance interval of said input data signal; and
holding means, responsive to said hold instruction signal for holding a count in said frequency division counter means during said hold instruction signal.

2. A phase synchronizing circuit as claimed in claim 1, wherein said hold instruction means includes a hold instruction circuit comprising a monostable multivibrator responsive to a signal representing discontinuance of said input data signal and a flip-flop circuit receiving at its data input an output from said monostable multivibrator and at its clock input the reproducing reference signal.

3. A phase synchronizing circuit as claimed in claim 2, wherein said holding means includes a first AND circuit one input thereto being an output of said flip-flop circuit, another input thereto being said oscillating signal from said oscillating means.

4. A phase synchronizing circuit as claimed in claim 3 further including a second AND circuit an input thereto receiving the output from said flip-flop circuit, another input thereto receiving said reproducing reference signal, whereby on elimination of presence of said hold instruction signal the control signal representing the phase difference between the reproducing reference signal and frequency divided oscillating signal will again allow modification of the count in said frequency division counter means, said phase detector means outputting as the control signal during presence of the hold instruction signal the control signal value produced at the production of said hold instruction signal.

5. A phase synchronizing circuit as claimed in claim 2, wherein said phase comparator means includes a phase comparison circuit, a switch means coupled to an output of said phase comparison circuit and a capacitance means coupled between a reference potential and an output of said switch means, the switch means receiving an output from said flip-flop to open said switch means in response to said hold instruction signal.

6. A phase synchronizing circuit for producing a signal synchronous with an input data signal comprising:
means for producing a reference signal synchronizing to a signal at a predetermined frequency included in said data signal;
oscillator means responsive to a control signal for producing an oscillating signal
means for frequency dividing said oscillating signal to produce a frequency divided signal;
phase comparator means for comparing a phase of the frequency divided signal with a phase of the reference signal an output of said phase comparator means being said control signal;

hold instruction means for producing a hold instruction signal in response to a predetermined condition of said input data signal, said hold instruction signal having a predetermined duration; and first means for inhibiting, for the duration of said hold instruction signal, said control signal from said oscillator means.

7. A phase synchronizing circuit as claimed in claim 6, further including second means for inhibiting, for the duration of said hold instruction signal, said reference signal from said phase comparator means.

8. In a time axis shift correcting circuit of a device for reading and reproducing an input data signal from a recording medium including means for producing an instruction signal requiring said input data reading and reproducing device to carry out a non-data signal reading or reproducing function for a selected time interval during which interval there is a discontinuance of said input data signal to a reference signal detecting means, said input data signal automatically returning to said reference signal detecting means after completion of said non-data reading or reproducing function; said input data signal including reference timing signals at a predetermined frequency, a phase synchronizing circuit for producing a signal synchronous with a time axis shift of said input data signal from said recording medium comprising:

reference signal detecting means for detecting said input data signal and reproducing a reproducing reference timing signal corresponding to said reference timing signal including in said data signal;

oscillating means for producing an oscillating signal at a frequency according to a control signal input to said oscillating means;

frequency division counter means for frequency dividing said oscillating signal to produce a frequency divided oscillating signal;

phase comparator means responsive to said reproducing reference timing signal and said frequency divided oscillating signal for producing said control signal according to a phase difference between said reproducing reference timing signal and said frequency divided oscillating signal, said oscillating signal being a clock signal following the time axis variation of said input data signal;

hold instruction means, responsive to said instruction signal, for producing a hold instruction signal said hold instruction means including delay means for maintaining the presence of said hold instruction signal for at least said selected time interval; and holding means responsive to said hold instruction signal for holding a count in said frequency division counter means during the presence of said hold instruction signal.

9. A phase synchronizing circuit as claimed in claim 9, wherein said delay means includes a monostable multivibrator responsive to said instruction signal, said hold instruction means further including a flip-flop circuit receiving at its data input an output from said monostable multivibrator and at its clock input the reproducing reference timing signal.

10. A phase synchronizing circuit as claimed in claim 9, wherein said holding means includes a first AND circuit one input thereto being an output of said flip-flop circuit, another input thereto being said oscillating signal from said oscillating means.

11. A phase synchronizing circuit as claimed in claim 10, wherein said holding means further includes a second AND circuit an input thereto receiving the output from said flip-flop circuit, another input thereto receiving said reproducing reference timing signal, whereby on elimination of the presence of said hold instruction signal after said selected time interval the control signal representing the phase difference between the reproducing reference timing signal and frequency divided oscillating signal will again allow modification of the count in said frequency division counter means, said phase detector means outputting as the control signal during the presence of said hold instruction signal the control signal value produced at the production of said hold instruction signal.

12. A phase synchronizing circuit as claimed in claim 9, wherein said phase comparator means includes a phase comparison circuit, a switch means coupled to an output of said phase comparison circuit and a capacitance means coupled between a reference potential and an output of said switch means, the switch means receiving an output from said flip-flop to open said switch means in response to said hold instruction signal.

13. In a device for sending an reproducing an input data signal from a recording medium including means for producing an instruction signal requiring said sending and reproducing device to carry out a non-data signal reading or reproducing function for a selected time interval during which interval there is a discontinuance of said input data signal to a reference signal producing means said input data signal being automatically reapplied to said reference signal producing means after said selected time interval, said input data signal including reference timing signals at a predetermined frequency, phase synchronizing circuit for producing a signal synchronous with said input data signal comprising;

means for producing a reference signal synchronized to a signal at said predetermined frequency of said reference timing signals of said input data signal;

oscillator means responsive to a control signal for producing an oscillating signal;

means for frequency dividing said oscillating signal to produce a frequency divided signal;

phase comparator means for comparing a phase of the frequency divided signal with a phase of the reference timing signal an output of said phase comparator means being said control signal;

hold instruction means for producing a hold instruction signal in response to said instruction signal, said hold instruction signal having a duration at least equal to said selected time interval; and first means for inhibiting, for the duration of said hold instruction signal, said control signal from said oscillator means.

14. A phase synchronizing circuit as claimed in claim 13, further including second means for inhibiting, for the duration of said hold instruction signal, said reference signal from said phase comparator means.

* * * * *